(12) United States Patent
Kiraly et al.

(10) Patent No.: US 10,489,908 B2
(45) Date of Patent: Nov. 26, 2019

(54) DEEP CONVOLUTIONAL ENCODER-DECODER FOR PROSTATE CANCER DETECTION AND CLASSIFICATION

(71) Applicant: Siemens Healthcare GmbH, Erlangen (DE)

(72) Inventors: Atilla Peter Kiraly, San Jose, CA (US); Clement Jad Abi Nader, Antibes (FR); Robert Grimm, Nürnberg (DE); Berthold Kiefer, Erlangen (DE); Ali Kamen, Skillman, NJ (US)

(73) Assignee: Siemens Healthcare GmbH, Erlangen (DE)

( * ) Notice: Subject to any disclaimer, the term of this patent is extended or adjusted under 35 U.S.C. 154(b) by 191 days.

(21) Appl. No.: 15/831,819

(22) Filed: Dec. 5, 2017

(65) Prior Publication Data

US 2018/0240233 A1 Aug. 23, 2018

Related U.S. Application Data

(60) Provisional application No. 62/461,970, filed on Feb. 22, 2017.

(51) Int. Cl.
*G06T 7/00* (2017.01)

(52) U.S. Cl.
CPC .. *G06T 7/0012* (2013.01); *G06T 2207/10088* (2013.01); *G06T 2207/10096* (2013.01);
(Continued)

(58) Field of Classification Search
CPC . G06T 2207/10088; G06T 2207/10096; G06T 2207/20081; G06T 2207/20084;
(Continued)

(56) References Cited

U.S. PATENT DOCUMENTS 8,295,575 B2 10/2012 Feldman et al.
2010/0329529 A1* 12/2010 Feldman .............. G06K 9/6252
382/131
(Continued)

OTHER PUBLICATIONS

Anthimopoulos et al., "Lung Pattern Classification for Interstitial Lung Diseases Using a Deep Convolutional Neural Network", IEEE Transactions on Medical Imaging, vol. 35, No. 5, May 2016, 10 pgs.
(Continued)

*Primary Examiner* — Manuchehr Rahmjoo (57) ABSTRACT

A method and apparatus for automated prostate tumor detection and classification in multi-parametric magnetic resonance imaging (MRI) is disclosed. A multi-parametric MRI image set of a patient, including a plurality of different types of MRI images, is received. Simultaneous detection and classification of prostate tumors in the multi-parametric MRI image set of the patient are performed using a trained multi-channel image-to-image convolutional encoder-decoder that inputs multiple MRI images of the multi-parametric MRI image set of the patient and includes a plurality of output channels corresponding to a plurality of different tumor classes. For each output channel, the trained image-to image convolutional encoder-decoder generates a respective response map that provides detected locations of prostate tumors of the corresponding tumor class in the multi-parametric MRI image set of the patient.

14 Claims, 7 Drawing Sheets

(52) U.S. Cl.
CPC ............... *G06T 2207/20081* (2013.01); *G06T 2207/20084* (2013.01); *G06T 2207/30081* (2013.01); *G06T 2207/30096* (2013.01)

(58) Field of Classification Search
CPC . G06T 2207/30081; G06T 2207/30096; G06T 7/0012
See application file for complete search history.

(56) References Cited

U.S. PATENT DOCUMENTS

| | | |
|---|---|---|
| 2016/0278661 A1 | 9/2016 | Griswold et al. |
| 2017/0176565 A1* | 6/2017 | Kwak ............... G01R 33/56341 |

OTHER PUBLICATIONS

Badrinarayanan et al., "SegNet: A Deep Convolutional Encoder-Decoder Architecture for Image Segmentation", Cvpr 2015, 2015; 14 pgs.
Chung et al., "Discovery Radiomics for Multi-Parametric MRI Prostate Cancer Detection", Computer Vision and Pattern Recognition, 2015, pp. 1-8.
Drozdzal et al., "The Importance of Skip Connections in Biomedical Image Segmentation", Springer International Publishing, Cham, 2015, 9 pgs.
Kainz et al., "You Should Use Regression to Detect Cells", Springer International Publishing, Switzerland, 2015, pp. 276-283.
Siegel et al., "CA: A Cancer Journal for Clinicians", Colorectal cancer statistics, May/Jun. 2017 vol. 67, Issue 3, pp. 177-193.
Al-Rfou et al., "Theano: A Python framework for fast computation of mathematical expressions", Theano Development Team, May 2016, 19 pgs.
Tofts et al., "Measurement of the Blood-Brain Barrier Permeability and Leakage Space Using Dynamic MR Imaging. 1. Fundamental Concepts", Magnetic Resonance in Medicine 17, 1991, 11 pgs.
Litjens et al., "Computer-aided detection of prostate cancer in MRI", IEE Transactions on Medical Imaging, May 2014, pp. 1083-1092.
Reda et al., "Computer-aided diagnostic tool for early detection of prostate cancer", 2016 IEEE International Conference on Image Processing (ICIP), pp. 2668-2672, Sep. 2016.
Kiraly A.P. et al. (2017) Deep Convolutional Encoder-Decoders for Prostate Cancer Detection and Classification. In: Descoteaux M., Maier-Hein L., Franz A., Jannin P., Collins D., Duchesne S. (eds) Medical Image Computing and Computer Assisted Intervention—MICCAI 2017. MICCAI 2017. Lecture Notes in Computer Science, vol. 10435. Springer, Cham; 20th International Conference on Medical Image Computing and Computer Assisted Intervention 2017 held Sep. 10-14, 2017 in Quebec City, Quebec Canada.
European Extended Search Report (EESR) dated Jul. 9, 2018 in corresponding European Patent Application No. 18157515.0.
Brosch Tom et al: "Deep Convolutional Encoder Networks for Multiple Sclerosis Lesion Segmentation", Nov. 18, 2015 (Nov. 18, 2015), Medical Image Computing and Computer-Assisted Intervention—MICCAI 2015: 18th International Conference, Munich, Germany, Oct. 5-9, 2015; Proceedings; [Lecture Notes in Computer Science; Lect.Notes Computer], Springer International Publishing, CH.
Yulian Zhu et al: "MRI-based prostate cancer detection with high-level representation and hierarchical classification", Medical Physics., vol. 44, No. 3, Jan. 20, 2017 (Jan. 20, 2017), pp. 1828-1039.

* cited by examiner

DEEP CONVOLUTIONAL ENCODER-DECODER FOR PROSTATE CANCER DETECTION AND CLASSIFICATION

This application claims the benefit of U.S. Provisional Application No. 62/461,970, filed Feb. 22, 2017, the disclosure of which is herein incorporated by reference.

BACKGROUND OF THE INVENTION

The present invention relates to automated detection and classification of prostate tumors in medical images, and more particularly, to automated detection and classification of prostate tumors in multi-parametric magnetic resonance (MR) images using a deep learning network.

Prostate cancer is the most frequently diagnosed cancer in American men with 181,000 new cases in 2016 resulting in more than 26,000 deaths. Early diagnosis often results in long term survival, but depends on invasive multicore biopsies that are typically guided by transrectal ultrasound (TRUS) imaging. Recently, multi-parametric magnetic resonance imaging (MRI) has shown promising results for use in non-invasive prostate cancer detection, as a strong correlation has been established between mpMRI and histological data. Prostate biopsies, whether blind or guided, are invasive and painful to the patient, whereas acquiring a multi-parametric MRI image set is substantially less invasive. If the same level of clinical decisions can be made using multi-parametric MRI, some or all of such invasive biopsies can be avoided and replaced with non-invasive "virtual biopsies" using multi-parametric MRI.

Two specific tasks are required in examination of multi-parametric magnetic resonance (MR) images. First, potential cancer regions must be detected, and second, these suspicious areas must be classified as benign or otherwise actionable (recommend biopsy). Manual reading multi-parametric MR images, which consist of as many as eight image channels, can be a tedious task. Furthermore, subtle and collective signatures of a cancerous lesion expressed within multi-parametric MR images are difficult to detect, even by an expert radiologist. Accordingly, a method for automated detection and classification of prostate tumors/lesions in multi-parametric MR images is desirable.

BRIEF SUMMARY OF THE INVENTION

The present invention provides a method and system for automated computer-based detection and classification of prostate tumors in multi-parametric magnetic resonance (MR) images. Embodiments of the present invention perform simultaneous detection and classification of prostate tumors in multi-parametric MR images of a patient using a deep image-to-image network. Multi-parametric MR images are directly entered to a trained deep image-to-image network, and no feature extraction pre-processing step is required.

In one embodiment of the present invention, a multi-parametric MRI image set of a patient is received, wherein the multi-parametric MRI image set includes a plurality of different types of MRI images of the patient. Simultaneous detection and classification of prostate tumors in the multi-parametric MRI image set of the patient are performed using a trained multi-channel image-to-image convolutional encoder-decoder, wherein the trained multi-channel image-to image convolutional encoder-decoder includes multiple input channels to input multiple MRI images of the multi-parametric MRI image set of the patient and a plurality of output channels corresponding to a plurality of different tumor classes, and for each output channel, the trained multi-channel image-to image convolutional encoder-decoder generates a respective response map that provides detected locations of prostate tumors of the corresponding tumor class in the multi-parametric MRI image set of the patient.

These and other advantages of the invention will be apparent to those of ordinary skill in the art by reference to the following detailed description and the accompanying drawings.

DETAILED DESCRIPTION

The present invention relates to a method and system for automated computer-based detection and classification of prostate tumors in multi-parametric magnetic resonance (MR) images. Embodiments of the present invention are described herein to give a visual understanding of the method for automated detection and classification of prostate tumors. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system.

Various techniques have been proposed to provide an automated solution to detection and classification of prostate cancer using multi-parametric MR images. Such techniques attempt to quantify contrast changes in multi-parameter MR images and use them in order to detect and classify suspicious lesions. Such previously proposed techniques employ separate processing to perform detection/localization of suspicious lesions in the prostate and classification of such lesions as benign or cancerous. Most of the previously proposed techniques are based on hand-crafted quantifiable image features, which are hypothesized to be important for the detection and classification tasks. Embodiments of the present invention perform automated detection and classification of prostate tumors/lesions in multi-parametric MR images of a patient using a deep image-to-image network. According to an advantageous aspect of the present invention, multi-parametric MR images are directly entered to a trained deep image-to-image network, and no feature extraction pre-processing step is required. In addition, embodiments of the present invention perform simultaneous detection and classification of tumors in the multi-parametric MR images. Accordingly, embodiments of the present invention provide improvements in accuracy and processing speed with respect to previously proposed techniques for automated prostate cancer detection and classification.

Embodiments of the present invention formulate the prostate cancer detection and classification problem as a multi-level segmentation problem. In an advantageous embodiment, the segmentation is considered to be a response map, which peaks at a tumor location and follows a Gaussian distribution in the vicinity of the tumor location. Multiple response channels are map channels are generated to consider multiple different classifications of lesions/tumors, such as both benign and malignant lesions. The terms "lesion" and "tumor" are used interchangeably herein. Embodiments of the present invention provide many advantageous over existing techniques for prostate cancer detection and classification. For example, the spatial uncertainty of a marked lesion is inherently considered through the use of the Gaussian standard deviation. Further, there is no specific need to determine a patch size that defines which neighborhood around the lesion is interrogated, as in an image patch-based moving window approach. The detection and classification of lesions in the prostate can be implemented using a deep encoder-decoder architecture. For example, the deep encoder-decoder architecture may be similar to a SegNet encoder-decoder architecture. However, instead of an anticipated segmentation output, local maxima within an output response map predict detected locations of tumors in the prostate. In addition, in an advantageous embodiment, the deep encoder-decoder architecture can have a multi-channel output that evaluates response maps for different output channels corresponding to different tumor classifications (e.g., benign and malignant) to simultaneously characterize/classify detected tumors. Accordingly, the deep encoder-decoder architecture can simultaneously perform detection and classification of multiple tumors and multiple classes of tumors within a series of multi-parametric input images. Depending on the availability of training samples with ground truth tumor boundaries, the method for prostate tumor detection and classification described herein may also be extended to perform tumor segmentation, as well as detection and classification.

Figure 1:
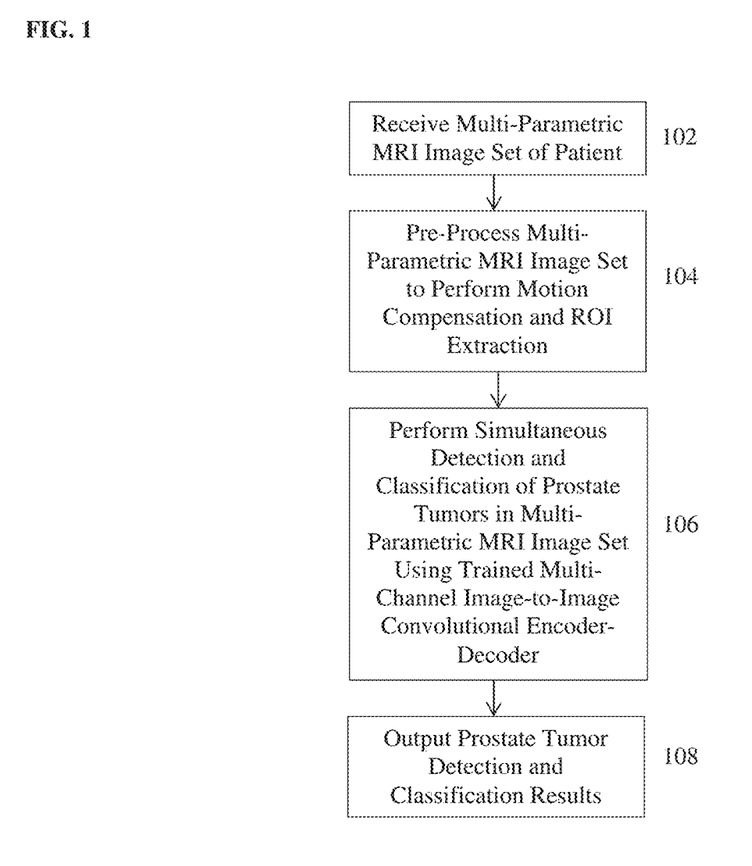
FIG. 1 illustrates a method for automated computer-based detection and classification of prostate tumors in multi-parametric magnetic resonance (MR) images according to an embodiment of the present invention.

FIG. 1 illustrates a method for automated computer-based detection and classification of prostate tumors in multi-parametric magnetic resonance (MR) images according to an embodiment of the present invention. Referring to FIG. 1, at step 102, a multi-parametric MRI image set of the prostate of a patient is received. The Multi-parametric MRI (mpMRI) image set of the prostate refers to a plurality of MRI images/maps of the patient's prostate acquired using various different MRI acquisition/image generation techniques. The different image channels acquired using different imaging techniques provide different information at locations in the prostate region of the patient. Corresponding pixel/voxel locations in the different image channels refer to the same location in the prostate region, and each pixel/voxel location has a vector of image values including a respective image value for each image channel. In an advantageous embodiment, the mpMRI image set of the prostate of the patient is a set of 3D MRI images. However, the method of FIG. 1 may be similarly implemented using 2D mpMRI images or 4D (3D+t) mpMRI images. Any or all of the images in the mpMRI image set of the patient's prostate can be received directly from an MRI scanner used to acquire the mpMRI images. Alternatively, any or all of the images in the mpMRI image set of the patient's prostate can be received by loading/retrieving previously acquired images from a storage or memory of a computer or receiving previously acquired images via an electronic transmission from a remote computer system.

In an advantageous embodiment, the mpMRI image set includes a T2-weighted pulse sequence (T2-weighted MRI image) that provides an overview of the prostate and zonal structure. The mpMRI image set can also include functional imaging, such as one or more diffusion weighted imaging (DWI) image depicting water molecule diffusion variations due to the microscopic tissue structures. DWI generates a set of images using different gradients (or b-values), which result in different reconstructed signal intensities. The mpMRI image set can also include an apparent diffusion coefficient (ADC) map which can be generated from the DWI image set. The ADC map is derived using the signal intensity changes of at least two b-values and provides a quantitative map demonstrating the degree of water molecule diffusion. Additionally, dynamic contrast enhanced (DCE) MRI can be included in the overall acquisition of the mpMRI image set. In DCE MRI, a series of temporally fast T1-weighted MRI images are acquired during rapid intravenous injection of a gadolinium-based contrast agent. Prostate cancer tissues often induce some level of angiogenesis, which is followed by an increased vascular permeability as compared to normal prostatic tissue. A K-Trans map can be generated from the DCE MRI image set and included in the mpMRI image set. K-Trans is a measure that provides an indicator of tissue permeability. In an exemplary implementation, the K-Trans map can be estimated using the well known Tofts model described in Tofts et al., "Measurements of the Blood-Brain Barrier Permeability and Leakage Space Using Dynamic MR Imaging. 1. Fundamental Concepts," *Magnetic Resonance in Medicine,* 17(2):357-67, 1991.

At step 104, the mpMRI image set is pre-processed to perform motion compensation and region-of-interest extraction. Prior to detection and classification of prostate tumors in mpMRI image set, the motion compensation can be performed on the mpMRI image set to compensate for any motion (e.g., patient movement) between the various MRI acquisitions (e.g., T2-weighted, DWI, DCE). In an advantageous implementation, 3D elastic registration is used in a cascade fashion to perform the motion compensation. In order to increase robustness, a pairwise registration is performed between the T2-weighted MRI image and a corresponding low b-value image in the DWI image set, resulting in a computed deformation field. The computed deformation field is then applied to compensate motion in the ADC parameter map. The computed deformation field can also be applied to compensate motion in other images of the DWI image set, such as a high b-value DWI image. Similarly, a pairwise registration is performed between the T2-weighted MR image and a late contrast-enhanced image representative of the DCE MRI image set, and the resulting computed deformation field is applied to perform motion compensation in the K-Trans map.

In a possible embodiment, in a case in which the MRI scans used to acquire the mpMRI image set covered an area larger than just the prostate region, a region-of-interest (ROI) surrounding the prostate can be extracted in the mpMRI image set. A predetermined size ROI mask can be applied to each slice of the 3D images in the mpMRI image set to ensure that only the prostate and surrounding area in each image is considered for the prostate detection and classification. In an exemplary implementation, an 80 mm×80 mm ROI mask can be applied to each slice. After the motion compensation and ROI extraction, the images in the mpMRI image set may then be reformatted into T2-weighted image grid with a predetermined size the corresponds to size of the input channels in the trained image-to-image convolutional encoder-decoder used to perform the prostate tumor detection and classification. In an exemplary implementation, all of the images can be reformatted into a T2-weighted image grid with the size of 100 mm×100 mm×60 mm, which corresponds to roughly 200× 200 pixels in each 2D slice.

At step 106, detection and classification of prostate tumors in the mpMRI image set are simultaneously performed using a trained multi-channel image-to-image convolutional encoder-decoder. The trained image-to-image convolutional encoder-decoder includes multiple input channels, each corresponding to a respective type of image in the mpMRI image set. The trained image-to-image convolutional encoder-decoder is trained to output response maps where responses signify localized lesions in the patient's prostate. The trained image-to-image convolutional encoder-decoder has multiple output channels and each one of the output channels represents a different tumor class. Accordingly, the trained image-to-image convolutional encoder-decoder outputs a respective response map for each of a plurality of tumor classes. The response map output for each tumor class provides detected locations of prostate tumors/lesions classified as that tumor class. In this way, the trained image-to-image convolutional encoder-decoder performs simultaneous detection and classification of prostate tumors. According to an advantageous implementation, the trained image-to-image convolutional encoder-decoder is trained to output a respective response map for each of the output channels (tumor classes) that with a Gaussian kernel centered at each detected tumor/lesion location for the corresponding tumor class. That is, the response map output for a given output channel is an image with an intensity that peaks at each detected tumor location and follows a Gaussian distribution in a vicinity of each detected tumor location. This results in a mask image in which the only pixels or voxels with non-zero intensity values are those within a Gaussian-defined circle (in 2D) or sphere (in 3D) surrounding each detected tumor location The standard deviation of the Gaussian distribution can be set in training.

In an advantageous embodiment, the trained image-to-image convolutional encoder-decoder has two output channels corresponding to benign and malignant prostate tumors, respectively. In this case, the trained image-to-image convolutional encoder-decoder inputs the mpMRI images and outputs a first response map showing detected locations of prostate tumors classified as benign and a second response map showing detected locations or prostate tumors classified as malignant. In particular, the first response map shows the detected locations of tumors classified as benign with a Gaussian intensity distribution centered at each detected location and the second response map shows the detected locations of tumors classified as malignant with a Gaussian intensity distribution centered at each detected location. The benign and malignant labels/classifications can correspond to certain Gleason scores. In this case, the malignant and benign class labels may actually represent clinically relevant tumor (Gleason score>6) and non-relevant (Gleason score<6), respectively. In other possible embodiments, additional output channels can also be included to represent other possible tumor classifications. In an advantageous embodiment, the trained image-to-image convolutional encoder-decoder can have four input channels and the input mpMRI image set for the patient can include the T2-weighted MR image, ADC map, a high b-value DWI image, and the K-Trans map. In other possible embodiments, different sets of mpMRI images or a subset of these mpMRI images may be input to the trained image-to-image convolutional encoder-decoder.

Figure 2:
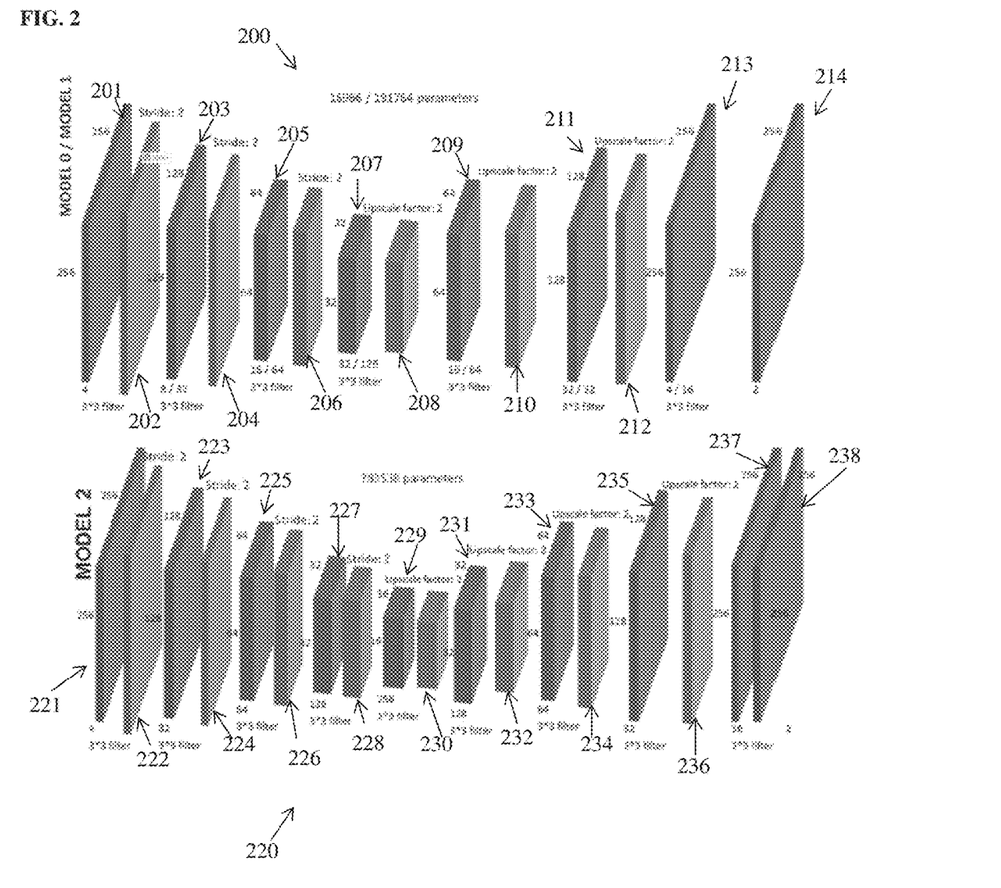
FIG. 2 illustrates exemplary network architectures used to implement the image-to-image convolutional encoder-decoder according to various embodiments of the present invention.

FIG. 2 illustrates exemplary network architectures used to implement the image-to-image convolutional encoder-decoder according to various embodiments of the present invention. Three image-to-image convolutional encoder-decoder networks, referred to as "Model 0", "Model 1", and "Model 2", are described herein. These image-to-image convolutional encoder-decoder networks (Models 0, 1, and 2) have increasing complexity in terms of number of parameters and layers. As shown in FIG. 2, convolutional encoder-decoder architecture 200 is used for Model 0 and Model 1. However, convolutional encoder-decoder architecture 200 is implemented with a greater number of parameters for Model 1 (191,764 parameters) as compared to Model 0 (16,966 parameters). In convolutional encoder-decoder architecture 200, layers 201, 203, 205, 207, 209, 211, 213, and 214 are convolutional layers, layers 202, 204, and 206 are max-pooling layers, and layers 208, 210, and 212 are up-sampling layers. Convolutional encoder-decoder architecture 220 is used for Model 2, which has 78358 parameters. In convolutional encoder-decoder architecture 220, layers 221, 223, 225, 227, 229, 231, 233, 235, 237, and 238 are convolutional layers, layers 222, 224, 226, and 228 are max-pooling layers, and layers 230, 232, 234, and 236 are up-sampling layers. Model 2, implemented using convolutional encoder-decoder architecture 220, includes an extra convolutional layer and max-pooling layer in its encoder network and an extra up-sampling layer and convolutional layer in its decoder network, as compared to Models 0 and 1, which are implemented using convolutional encoder-decoder architecture 200.

In both architectures 200 and 220 shown in FIG. 2, the number immediately below each convolutional layer (e.g., "4" for layer 201) indicates a number of output channels for the convolutional layer (i.e., a number of feature maps generated by the convolutional layer). In architecture 200, when two numbers are provided for the number of output channels for a convolutional layer (e.g., "8/32" for layer 203), the first number indicates the number of output channels for that convolutional layer in Model 0 and the second number indicates the number of output channels for that convolutional layer in Model 1. As shown in FIG. 2, each convolutional layer in the encoder and decoder networks of each architecture 200 and 220 uses a 3*3 filter to perform convolution. In both architectures 200 and 220 shown in FIG. 2, the number adjacent to top and front edges of each convolutional layer (e.g., "256" for layer 201) indicates the size of the feature map at that convolutional layer. For Model 0, Model 1, and Model 2, batch normalization is used after each convolutional layer during training. An elementwise activation function is also applied to the feature maps after each convolutional layer. In an exemplary embodiment, a rectified linear (ReLU) is used for the activation function for each convolutional layer. In other possible embodiments, a Leaky ReLU ($\alpha$=0.01) or a Very Leaky ReLU ($\alpha$=0.3) can be used for the activation function for each convolutional layer instead of a ReLU. As shown by output layers 214 and 238 of architectures 200 and 220, respectively, in FIG. 2, the output of each model (Model 0, Model 1, and Model 2) includes two output channels signifying the malignant and benign tumor classes. In the embodiment of FIG. 2, each model (Model 0, Model 1, and Model 2) inputs four channels corresponding to input images of a T2-weighted MRI image, ADC map, high b-value DWI image, and K-trans map. In other possible embodiments, the input images may be varied. In a possible implementation, skip-connections can be added to the Model 0, Model 1, and/or Model 2.

Figure 3:
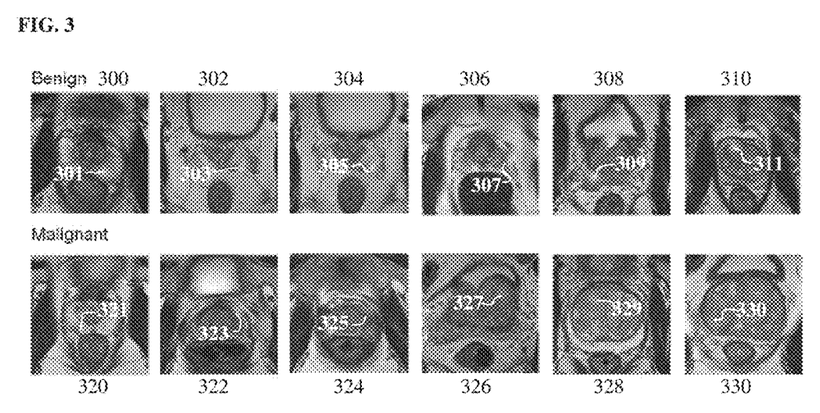
FIG. 3 illustrates examples of Gaussian responses for ground truth benign and malignant prostate tumors locations.

The image-to-image convolutional encoder-decoder (Model 0, Model 1, or Model 2) is trained in an offline training stage to perform simultaneous prostate tumor detection and classification based on training data with known ground truth tumor/lesion locations and classifications. The training data advantageously includes a large number of training mpMRI image sets with annotated tumor/lesion center locations and corresponding tumor classifications. In an advantageous embodiment, the tumors in the training mpMRI image sets are classified using two class labels of malignant/clinically relevant (Gleason score>6) and benign/non-relevant (Gleason score 6). In an exemplary implementation, each training mpMRI image set may include a T2-weighted MR image, an ADC map, a high b-value DWI image, and a K-Trans map. Each training mpMRI image set is pre-processed to perform motion compensation, as described above in step 104. Additionally, a predetermined size (e.g., 80 mm×80 mm) ROI mask each training mpMRI image set is used on each slice of each training mpMRI image set to make sure that only prostate and surrounding areas are considered for training. After intra patient registration (motion compensation) and ROI extraction, all of the images in the training mpMRI images sets can be reformatted into a T2-weighted image grid of a predetermined size. In an exemplary implementation, all of the training images are reformatted into a T2-weighted image grid with the size of 100 mm×100 mm×60 mm, which corresponds to roughly 200×200 pixels in the 2D slices. Two ground truth response maps corresponding to benign and malignant tumor labels, respectively, are created for each training mpMRI image set based on the annotated ground truth tumor locations and classifications. For a given training mpMRI image set, the ground truth response map for a given tumor class (e.g., malignant or benign) is created by generating a Gaussian distribution (e.g., with 3$\sigma$ of 10 mm) centered at each ground truth tumor center location of the given class in a 2D slice containing the ground truth tumor center location. The Gaussian distribution for each ground truth center location is also propagated in 3D through the plane with a standard deviation adjusted based on pixel spacing. FIG. 3 illustrates examples of Gaussian responses for ground truth benign and malignant prostate tumors locations. As shown in FIG. 3, sample slices 300, 302, 304, 306, 308, 310 from T2-weighted MRI images are coupled/overlaid with Gaussian responses 301, 303, 305, 307, 309, and 311, respectively, corresponding to ground truth locations of benign tumors. Sample slices 320, 322, 324, 326, 328, and 330 from T2-weighted MR images are coupled/overlaid with Gaussian responses 321, 323, 325, 327, 329, and 331, respectively, corresponding to ground truth locations of malignant tumors. In an advantageous embodiment, only slices of the training mpMRI images with tumor labels either benign or malignant are selected to be used as training samples for training the image-to-image convolutional encoder-decoder. The image-to-image convolutional encoder-decoder can be trained using back propagation and gradient descent to learn weights that minimize a loss function that measures the difference/error between and the ground truth response maps and predicted response maps generated by the image-to-image convolutional encoder-decoder over all tumor classes and all training samples. In a possible implementation, the training data can be augmented by adding Gaussian noise to the training data in order to increase robustness in the training.

Once the image-to-image convolutional encoder-decoder is trained, the trained image-to-image convolutional encoder-decoder can be stored on a memory or storage of a computer system and used to perform simultaneous detection and classification of prostate tumors in newly received/input mpMRI images of a patient. In an advantageous embodiment, the image-to-image convolutional encoder-decoder can be trained to input a 2D slice from each of a plurality mpMRI images (e.g., T2-weighted, ADC, high b-value DWI, and K-Trans) and generate/output a respective 2D response map corresponding to the input slice for each of the tumor classes (e.g., benign and malignant). In this case, a received 3D mpMRI image set of a patient can be input to the trained image-to-image convolutional encoder-decoder slice by slice (with each input set of images including a corresponding slice from each of mpMRI images), and the trained image-to-image convolutional encoder-decoder can perform simultaneous detection and classification of prostate tumors for each input slice and generate 2D benign and malignant tumor response maps corresponding to each input slice. In another possible embodiment, the image-to-image convolutional encoder-decoder can be trained to input a plurality of 3D mpMRI images and directly generate/output a respective 3D response map for each of the tumor classes. In this case, the set of 3D mpMRI images for a patient can be input to the trained image-to-image convolutional encoder-decoder, and the trained image-to-image convolutional encoder-decoder can perform simultaneous prostate tumor detection and classification in the 3D mpMRI image and generate a corresponding 3D benign tumor response map and a corresponding 3D malignant tumor response map.

Returning to FIG. 1, at step 108, the prostate tumor detection and classification results are output. The prostate tumor detection and classification results can be output by displaying the prostate tumor detection and classification results on a display device of a computer system. For example, the benign tumor response maps and malignant tumor response maps can be displayed on a display device. In a possible embodiment, the prostate tumor detection and classification results can be output by overlaying the generated benign tumor response maps and malignant tumor response maps on structural MRI images, such as T2-weighted MRI images. For example, 2D response maps generated for begin and malignant tumors can be overlaid on corresponding slices of the T2-weighted MRI image of the patient and displayed on a display device. In a possible embodiment, the generated benign tumor response maps and the generated malignant tumor response maps can be overlaid on slices of the T2-weighted MRI image using different colors to represent detected benign and malignant tumors in order to provide an easily distinguishable indication of the classification of each detected tumor. In a possible implementation, 3D response maps generated for the benign and malignant tumors can be overlaid on a 3D T2-weighted MR image of the patient and displayed as a 3D visualization. The generated benign and malignant response maps can also be overlaid on other images in the mpMRI image set of the patient, such as the ADC map, K-Trans map, high b-value DWI image, or any other medical image of the patient.

The present inventors various experiments to test and evaluate the automated prostate tumor detection and classification method described herein. Data collected from patients with a suspicion of prostate cancer was used to train the image-to-image convolutional encoder-decoder. The patients were all imaged using 3 Tesla (3 T) MRI scanners without an endo-rectal coil. Overall 202 multi-parametric MRI datasets were processed. For annotation, the center lesion locations and corresponding classifications were known. The mpMRI image sets were pre-processed to perform motion compensation, and an 80 mm×80 mm ROI mask was used on each slice to make sure that only the prostate and surrounding areas were considered. All images were then reformatted into a T2-weighted image grid with the size of 100 mm×100 mm×60 mm, which corresponds roughly to 200×200 pixels 2D slices. The ground truth maps corresponding to benign and malignant tumor labels were created for each dataset by creating a Gaussian distribution with 3σ of 10 mm at each tumor center point in a corresponding 2D slice. The Gaussian distribution was propagated though the plane with a standard deviation adjusted based on pixel spacing. Only slices with tumor labels either benign or malignant were selected for processing. This set included a total of 824 slices out of the entire 202 multi-parametric MRI volumes.

The three different image-to-image convolutional encoder-decoder networks described herein (Model 0, Model 1, and Model 2) were trained and used to perform prostate cancer detection and classification. In addition to the three networks, the present inventors evaluated modifications to the input images available, different activation functions (ReLU, Leaky ReLU, and Very Leaky ReLU), adding skip-connections to the image-to-image convolutional encoder-decoder networks, and training data augmentation by Gaussian noise addition. The networks were trained using Theano. In order to assess the sampling variability, the present inventors performed 5-fold cross validation bootstrapped five times with different sets of data chosen randomly for training and testing. Using this approach, the present inventors were able to get a range of performances and can computer a sampling independent average performance. For evaluating the performance, the area under the curve (AUC) for each of the detection/classification runs is used. In addition, the validation is performed based on leaving a patient completely out for training and not having slices from a patient dataset present in both training and testing.

Figure 4:
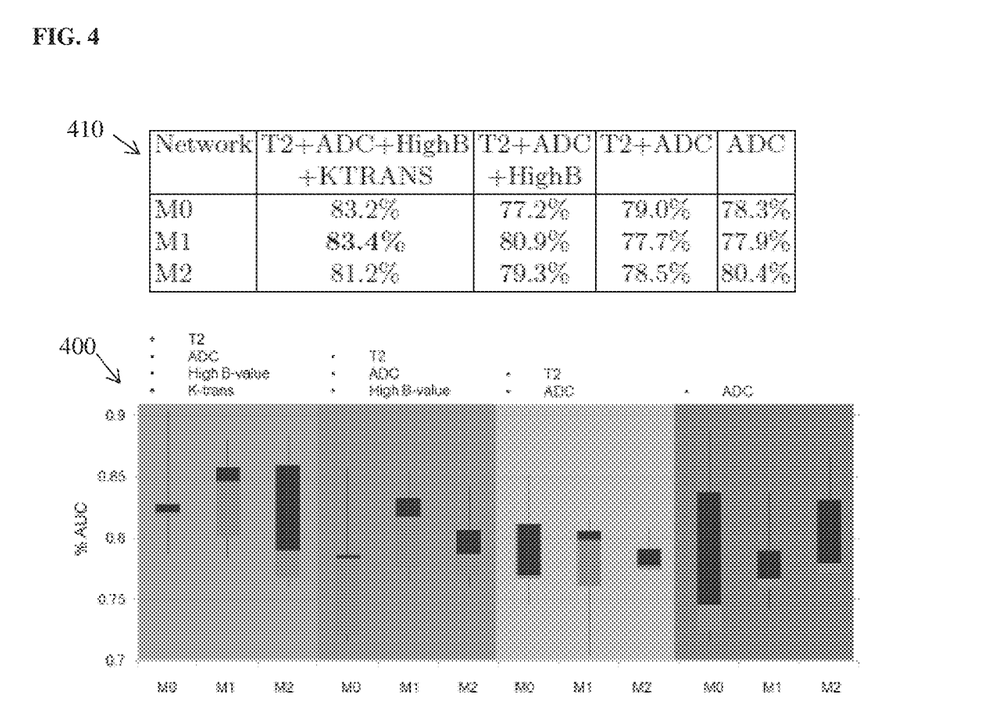
FIG. 4 illustrates exemplary performance results of prostate tumor detection and classification for the different models using varying number of input mpMRI images.

The present inventors tested the performance of the different image-to-image convolutional encoder-decoder networks (Model 0, Model 1, and Model 2) using a varying number of multi-parametric input channels. FIG. 4 illustrates exemplary performance results of prostate tumor detection and classification for the different models using varying number of input mpMRI images. Each of Model 0 (M0), Model 1 (M1), and Model 2 (M2) was used to perform a number of prostate tumor detection and classification runs using a set of four input mpMRI images (T2-weighted, ADC map, high b-value DWI, and K-Trans map), a set of three input mpMRI images (T2-weighted, ADC map, and high b-value DWI), a second of two input mpMRI images (T2-weighted and ADC map), and a single input ADC map. As shown in FIG. 4, graph 400 shows plots of AUC results for the different models (M0, M1, M2) using the different sets of input image modalities, and table 410 shows average AUC results for the different models (Mo, M1, M2) with different input image modalities. It is clear from the results shown in FIG. 4 that the aggregate of all modalities (i.e., the set of four input images) produced the best result across all of the models. While the use of all four input image modalities gives the bet performance results, it may be desirable to achieve a compromise between the acquisition length (smaller number of parameters) and the performance. A possible compromise could be to eliminate the DCE scan (and the resultant K-Trans image), which includes an associated contrast requirement, and still provide a clinically acceptable Negative Predictive (by selecting a good operating point on the ROC curve). It is also clear from the results shown in FIG. 4 that Model 1 produces the best average AUC with smallest variability, while Model 0 has a more optimal single AUC score among all the folds tested.

Figure 5:
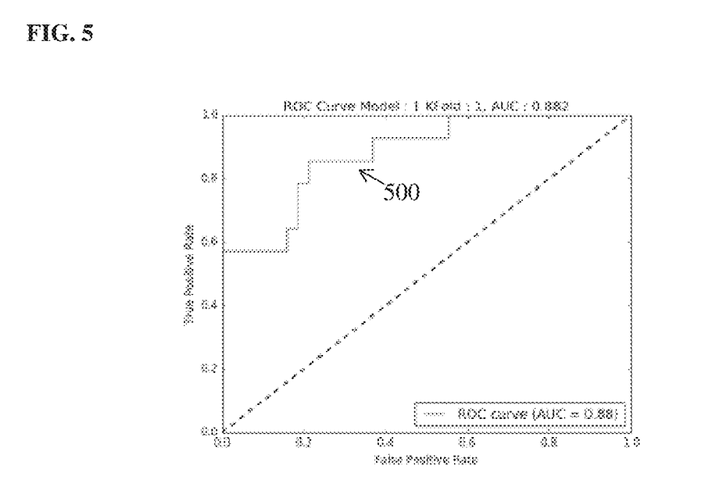
FIG. 5 illustrates an exemplary receiver operating characteristic (ROC) curve of Model 1 using the set of four input mpMRI images.
Figure 6:
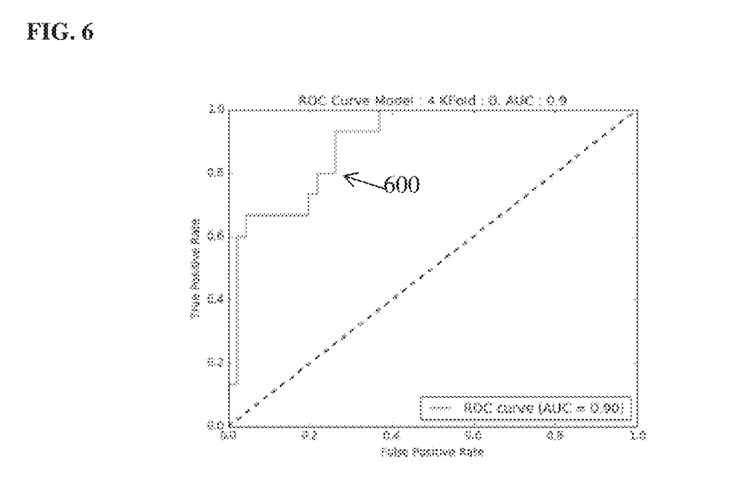
FIG. 6 illustrates an exemplary ROC curve of Model 1 using skip connections and training data augmentation by Gaussian noise addition.

FIG. 5 illustrates an exemplary receiver operating characteristic (ROC) curve 500 of Model 1 using the set of four input mpMRI images. As shown FIG. 5, the AUC calculated from the ROC curve 500 is 88%. FIG. 6 illustrates an exemplary ROC curve 600 of Model 1 using skip connections and training data augmentation by Gaussian noise addition. Training data augmentation by Gaussian noise addition did not result in consistent improvements. A maximum AUC of 90% was reached when skip connections were applied on Model, as shown on the ROC curve 600 in FIG. 6.

Figure 7:
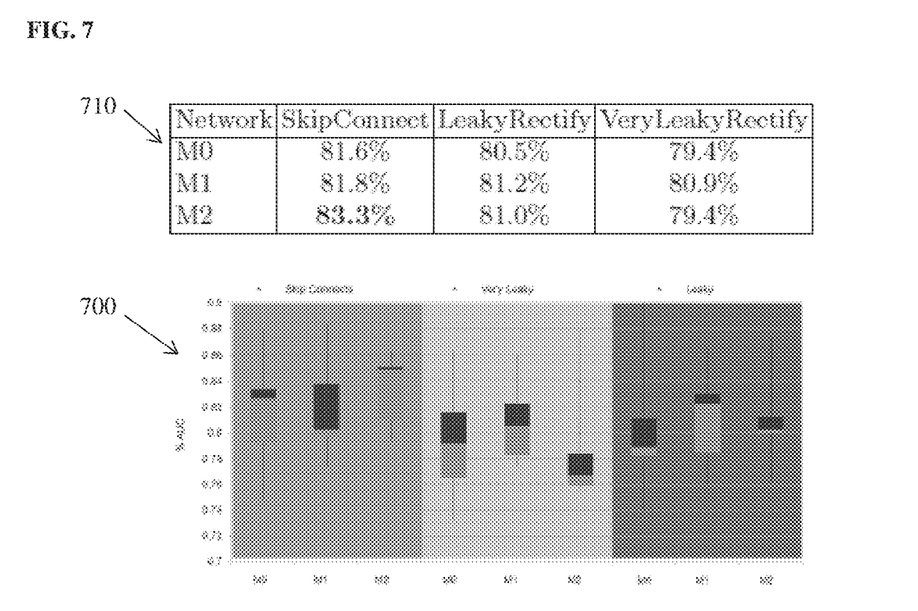
FIG. 7 illustrates exemplary performance results for prostate tumor detection and classification using the different models with skip connections and modified activation functions.

FIG. 7 illustrates exemplary performance results for prostate tumor detection and classification using the different models (M0, M1, and M2) with skip connects and modified activation functions. The number of input image channels was fixed at four and a number of runs pf automated prostate tumor detection and classification were performed using each of the networks/models (M0, M1, and M2) with skip-connections added, with a Leaky ReLU ($\alpha=0.01$) used as the activation function in place of the ReLU, and with a Very Leaky LeRU ($\alpha=0.3$) used as the activation function in place of the LeRU. As shown in FIG. 7, graph 700 shows plots of AUC results for the different models (M0, M1, M2) using skip-connections, a Leaky ReLU, and a Very Leaky ReLU, and table 710 shows average AUC results for the different models (Mo, M1, M2) with skip connections, a Leaky ReLU, and a Very Leaky ReLU. Using the Leaky ReLU and the Very Leaky ReLU resulted in diminished performance as compared to ReLUs. However, adding skip-connections resulted in improved performances for the most complex model (M2) with an average AUC of 83.3% and reduced variability across folds.

Overall, the experimental results show that the method described herein is competitive to and provides advantages over existing methods for automated prostate tumor detection and classification. Further, as the volume of data used to train the image-to-image convolutional encoder-decoder, it is expected that the results of this method will continue to approve.

Figure 8:
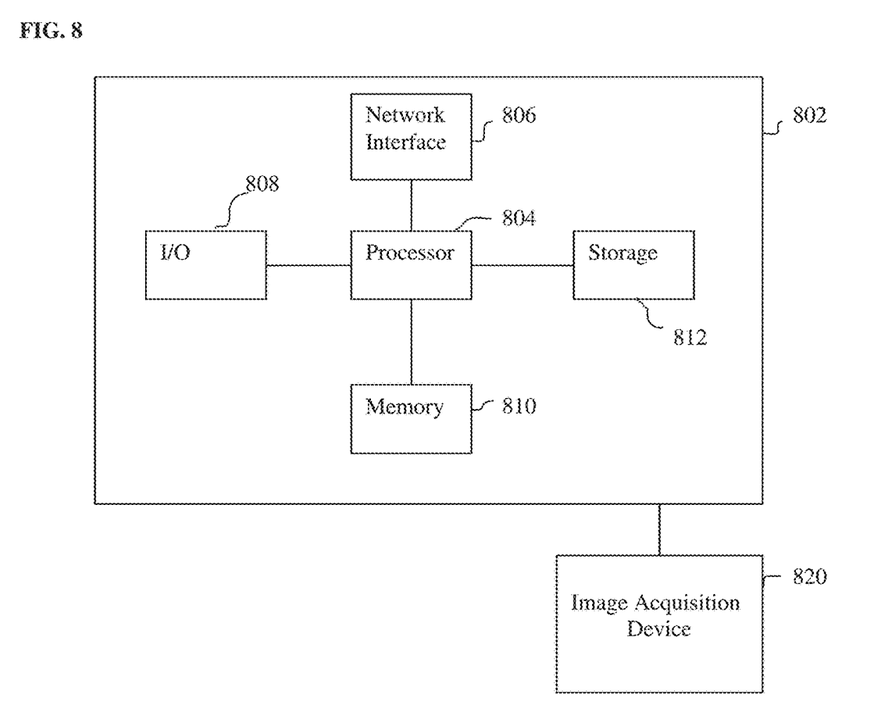
FIG. 8 is a high-level block diagram of a computer capable of implementing the present invention.

The above-described methods for automated prostate tumor/lesion detection and classification in multi-parametric MRI images may be implemented on a computer using well-known computer processors, memory units, storage devices, computer software, and other components. A high-level block diagram of such a computer is illustrated in FIG. 8. Computer 802 contains a processor 804, which controls the overall operation of the computer 802 by executing computer program instructions which define such operation. The computer program instructions may be stored in a storage device 812 (e.g., magnetic disk) and loaded into memory 810 when execution of the computer program instructions is desired. Thus, the steps of the methods of FIG. 1 may be defined by the computer program instructions stored in the memory 810 and/or storage 812 and controlled by the processor 804 executing the computer program instructions. An image acquisition device 820, such as an MRI scanner, can be connected to the computer 802 to input image data to the computer 802. It is possible to implement the image acquisition device 820 and the computer 802 as one device. It is also possible that the image acquisition device 820 and the computer 802 communicate wirelessly through a network. In a possible embodiment, the computer 802 can be located remotely with respect to the image acquisition device 820 and the method steps described herein can be performed as part of a server or cloud based service. In this case, the method steps may be performed on a single computer or distributed between multiple networked computers. The computer 802 also includes one or more network interfaces 806 for communicating with other devices via a network. The computer 802 also includes other input/output devices 808 that enable user interaction with the computer 802 (e.g., display, keyboard, mouse, speakers, buttons, etc.). Such input/output devices 6808 may be used in conjunction with a set of computer programs as an annotation tool to annotate images/volumes received from the image acquisition device 820. One skilled in the art will recognize that an implementation of an actual computer could contain other components as well, and that FIG. 8 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for automated prostate tumor detection and classification in multi-parametric magnetic resonance imaging (MRI) images of a patient, comprising:
   receiving a multi-parametric MRI image set of a patient, wherein the multi-parametric MRI image set includes a plurality of different types of MRI images of the patient;
   performing simultaneous detection and classification of prostate tumors in the multi-parametric MRI image set of the patient using a trained multi-channel image-to-image convolutional encoder-decoder, wherein the trained multi-channel image-to image convolutional encoder-decoder includes multiple input channels to input multiple MRI images of the multi-parametric MRI image set of the patient and a plurality of output channels corresponding to a plurality of different tumor classes, and for each output channel, the trained multi-channel image-to image convolutional encoder-decoder generates a respective response map that provides detected locations of prostate tumors of the corresponding tumor class in the multi-parametric MRI image set of the patient, wherein
   for the respective response map generated by the trained multi-channel image-to image convolutional encoder-decoder for each output channel is an image with intensity values that peak at each detected location of a prostate tumor of the corresponding tumor class and follow a Gaussian distribution in a vicinity of each detected location of a prostate tumor of the corresponding tumor class, and wherein
   the plurality of different tumor classes includes a benign tumor class and a malignant tumor, and the trained multi-channel image-to image convolutional encoder-decoder generates a first response map that provides detected locations of benign prostate tumors in the multi-parametric MRI image set of the patient and a second response map that provides detected locations of malignant prostate tumors in the multi-parametric MRI image set of the patient.

2. The method of claim 1, wherein the trained multi-channel image-to image convolutional encoder-decoder is trained based on a plurality of training multi-parametric MRI image sets and ground truth response maps for benign and malignant tumors that are generated for each of the plurality of training multi-parametric MRI image sets.

3. The method of claim 1, further comprising: performing motion compensation on the plurality of different types of MRI images in the multi-parametric MRI image set of the patient prior to performing the simultaneous detection and classification of the prostate tumors in the multi-parametric MRI image set of the patient using the trained multi-channel image-to-image convolutional encoder-decoder.

4. The method of claim 3, further comprising: extracting a region-of-interest (ROI) corresponding to the prostate and a surrounding area on each of a plurality of slices of the plurality of different types of MRI images in the multi-parametric MRI image set of the patient.

5. The method of claim 1, wherein the multi-parametric MRI image set of the patient comprises a T2-weighted MRI image, an apparent diffusion coefficient (ADC) map derived from a diffusion weighted imaging (DWI) scan, a high b-value DWI image, and a K-Trans map generated from dynamic contrast enhanced (DCE) MRI scan, and the trained multi-channel image-to image convolutional encoder-decoder includes a respective input channel to input each of the T2-weighted MRI image, the ADC map, the high b-value DWI image, and the K-Trans map.

6. The method of claim 1, wherein the multi-parametric MRI image set of the patient comprises a T2-weighted MRI image, an apparent diffusion coefficient (ADC) map derived from a diffusion weighted imaging (DWI) scan, and a high b-value DWI image, and the trained multi-channel image-to image convolutional encoder-decoder includes a respective input channel to input each of the T2-weighted MRI image, the ADC map, and the high b-value DWI image.

7. An apparatus for automated prostate tumor detection and classification in multi-parametric magnetic resonance imaging (MRI) images of a patient, comprising: means for receiving a multi-parametric MRI image set of a patient, wherein the multi-parametric MRI image set includes a plurality of different types of MRI images of the patient;
   means for performing simultaneous detection and classification of prostate tumors in the multi-parametric MRI image set of the patient using a trained multi-channel image-to-image convolutional encoder-decoder, wherein the trained multi-channel image-to image convolutional encoder-decoder includes multiple input channels to input multiple MRI images of the multi-parametric MRI image set of the patient and a plurality of output channels corresponding to a plurality of different tumor classes, and for each output channel, the trained multi-channel image-to image convolutional encoder-decoder generates a respective response map that provides detected locations of prostate tumors of the corresponding tumor class in the multi-parametric MRI image set of the patient, wherein for the respective response map generated by the trained multi-channel image-to image convolutional encoder-decoder for each output channel is an image with intensity values that peak at each detected location of a prostate tumor of the corresponding tumor class and follow a Gaussian distribution in a vicinity of each detected location of a prostate tumor of the corresponding tumor class, and wherein the plurality of different tumor classes includes a benign tumor class and a malignant tumor, and the trained multi-channel image-to image convolutional encoder-decoder generates a first response map that provides detected locations of benign prostate tumors in the multi-parametric MRI image set of the patient and a second response ma that provides detected locations of malignant prostate tumors in the multi-parametric MRI image set of the patient.

8. The apparatus of claim 7, further comprising: means for performing motion compensation on the plurality of different types of MRI images in the multi-parametric MRI image set of the patient prior to performing the simultaneous detection and classification of the prostate tumors in the multi-parametric MRI image set of the patient using the trained multi-channel image-to-image convolutional encoder-decoder.

9. The apparatus of claim 7, wherein the multi-parametric MRI image set of the patient comprises a T2-weighted MRI image, an apparent diffusion coefficient (ADC) map derived from a diffusion weighted imaging (DWI) scan, a high b-value DWI image, and a K-Trans map generated from dynamic contrast enhanced (DCE) MRI scan, and the trained multi-channel image-to image convolutional encoder-decoder includes a respective input channel to input each of the T2-weighted MRI image, the ADC map, the high b-value DWI image, and the K-Trans map.

10. A non-transitory computer readable medium storing computer program instructions for automated prostate tumor detection and classification in multi-parametric magnetic resonance imaging (MRI) images of a patient, the computer program instructions when executed by processor cause the processor to perform operations comprising:

receiving a multi-parametric MRI image set of a patient, wherein the multi-parametric MRI image set includes a plurality of different types of MRI images of the patient;

performing simultaneous detection and classification of prostate tumors in the multi-parametric MRI image set of the patient using a trained multi-channel image-to-image convolutional encoder-decoder, wherein the trained multi-channel image-to image convolutional encoder-decoder includes multiple input channels to input multiple MRI images of the multi-parametric MRI image set of the patient and a plurality of output channels corresponding to a plurality of different tumor classes, and for each output channel, the trained multi-channel image-to image convolutional encoder-decoder generates a respective response map that provides detected locations of prostate tumors of the corresponding tumor class in the multi-parametric MRI image set of the patient, wherein for the respective response map generated by the trained multi-channel image-to image convolutional encoder-decoder for each output channel is an image with intensity values that peak at each detected location of a prostate tumor of the corresponding tumor class and follow a Gaussian distribution in a vicinity of each detected location of a prostate tumor of the corresponding tumor class, and wherein the plurality of different tumor classes includes a benign tumor class and a malignant tumor, and the trained multi-channel image-to image convolutional encoder-decoder generates a first response map that provides detected locations of benign prostate tumors in the multi-parametric MRI image set of the patient and a second response map that provides detected locations of malignant prostate tumors in the multi-parametric MRI image set of the patient.

11. The non-transitory computer readable medium of claim 10, wherein the trained multi-channel image-to image convolutional encoder-decoder is trained based on a plurality of training multi-parametric MRI image sets and ground truth response maps for benign and malignant tumors that are generated for each of the plurality of training multi-parametric MRI image sets.

12. The non-transitory computer readable medium of claim 10, wherein the operations further comprise: performing motion compensation on the plurality of different types of MRI images in the multi-parametric MRI image set of the patient prior to performing the simultaneous detection and classification of the prostate tumors in the multi-parametric MRI image set of the patient using the trained multi-channel image-to-image convolutional encoder-decoder.

13. The non-transitory computer readable medium of claim 10, wherein the multi-parametric MRI image set of the patient comprises a T2-weighted MRI image, an apparent diffusion coefficient (ADC) map derived from a diffusion weighted imaging (DWI) scan, a high b-value DWI image, and a K-Trans map generated from dynamic contrast enhanced (DCE) MRI scan, and the trained multi-channel image-to image convolutional encoder-decoder includes a respective input channel to input each of the T2-weighted MRI image, the ADC map, the high b-value DWI image, and the K-Trans map.

14. The non-transitory computer readable medium of claim 13, wherein the multi-parametric MRI image set of the patient comprises a T2-weighted MRI image, an apparent diffusion coefficient (ADC) map derived from a diffusion weighted imaging (DWI) scan, and a high b-value DWI image, and the trained multi-channel image-to image convolutional encoder-decoder includes a respective input channel to input each of the T2-weighted MRI image, the ADC map, and the high b-value DWI image.

* * * * *